US010479655B2

(12) United States Patent
Fernandez et al.

(10) Patent No.: US 10,479,655 B2
(45) Date of Patent: Nov. 19, 2019

(54) INSTALLATION AND SUPPORT METHOD INCLUDING A TOWER CRANE FOR SUPPORTING A HIGH-VOLTAGE LINE ELECTRIC CABLE

(71) Applicant: MANITOWOC CRANE GROUP FRANCE, Dardilly (FR)

(72) Inventors: Joachim Fernandez, Saint Pierre de Varennes (FR); Brice Dal Corso, Marcy l'Etoile (FR); Jean-Christophe Goiffon, Villeurbanne (FR)

(73) Assignee: Manitowoc Crane Group France, Dardilly (FR)

( * ) Notice: Subject to any disclaimer, the term of this patent is extended or adjusted under 35 U.S.C. 154(b) by 330 days.

(21) Appl. No.: 15/637,934

(22) Filed: Jun. 29, 2017

(65) Prior Publication Data
US 2018/0002145 A1    Jan. 4, 2018

(30) Foreign Application Priority Data

Jun. 30, 2016 (FR) ..................................... 16 56163

(51) Int. Cl.
| | | |
|---|---|---|
| *B66C 19/02* | (2006.01) | |
| *B66C 23/18* | (2006.01) | |
| *B66F 11/04* | (2006.01) | |
| *H04B 3/54* | (2006.01) | |
| *B66C 23/26* | (2006.01) | |
| *H02G 1/02* | (2006.01) | |

(52) U.S. Cl.
CPC .............. *B66C 19/02* (2013.01); *B66C 23/18* (2013.01); *B66C 23/26* (2013.01); *B66F 11/04* (2013.01); *H02G 1/02* (2013.01); *H04B 3/544* (2013.01)

(58) Field of Classification Search
CPC ......... B66C 23/18; B66C 23/26; B66F 11/04; H02G 1/02; H04B 3/544
See application file for complete search history.

(56) References Cited

U.S. PATENT DOCUMENTS

| | | | | |
|---|---|---|---|---|
| 2,621,804 A | * | 12/1952 | Allard | ..................... B66C 23/60 |
| | | | | 212/235 |
| 2,670,177 A | * | 2/1954 | Pearson | .................. B66C 23/36 |
| | | | | 254/311 |
| 5,829,605 A | * | 11/1998 | Poitras | .................... B60P 3/125 |
| | | | | 212/180 |

(Continued)

FOREIGN PATENT DOCUMENTS

| | | |
|---|---|---|
| CN | 203813323 U | 9/2014 |
| EP | 3056465 A1 | 8/2016 |

(Continued)

*Primary Examiner* — Michael E Gallion
(74) *Attorney, Agent, or Firm* — Levenfeld Pearlstein, LLC

(57) ABSTRACT

A support installation includes support members for supporting an electric cable, a tower crane, a mast and a jib linked to an upper portion of the mast. The jib and the mast respectively extend according to a jib direction and a substantially vertical mast direction. The support members are secured to the jib and disposed at a plurality of locations distant according to the jib direction. The support members extend transversally to the jib direction to protrude laterally from the jib. The jib is cantilevered when the support installation is in the service configuration.

16 Claims, 4 Drawing Sheets

(56) References Cited

U.S. PATENT DOCUMENTS

| | | | | |
|---|---|---|---|---|
| 6,202,013 B1* | 3/2001 | Anderson | ............... | B66C 13/40 |
| | | | | 701/50 |
| 8,235,230 B2* | 8/2012 | Juraszek | ................ | B66C 13/30 |
| | | | | 212/278 |
| 8,851,823 B1* | 10/2014 | Hallmon, Jr. | .......... | B66C 23/44 |
| | | | | 414/540 |
| 9,062,824 B2* | 6/2015 | Yustus | ................... | F16M 11/18 |
| 2001/0006596 A1* | 7/2001 | Vickary | ................... | B66C 1/42 |
| | | | | 414/543 |
| 2003/0160016 A1* | 8/2003 | Ortiz | ...................... | B66C 23/42 |
| | | | | 212/300 |
| 2008/0149583 A1* | 6/2008 | Welker | ................... | B66C 23/44 |
| | | | | 212/180 |
| 2017/0305727 A1* | 10/2017 | Schoonmaker | ......... | B66C 23/42 |
| 2017/0313556 A1* | 11/2017 | Griese | ................... | B66C 23/18 |

FOREIGN PATENT DOCUMENTS

| | | | |
|---|---|---|---|
| FR | 2778193 A1 | 11/1999 | |
| FR | 2967526 A1 | 5/2012 | |

\* cited by examiner

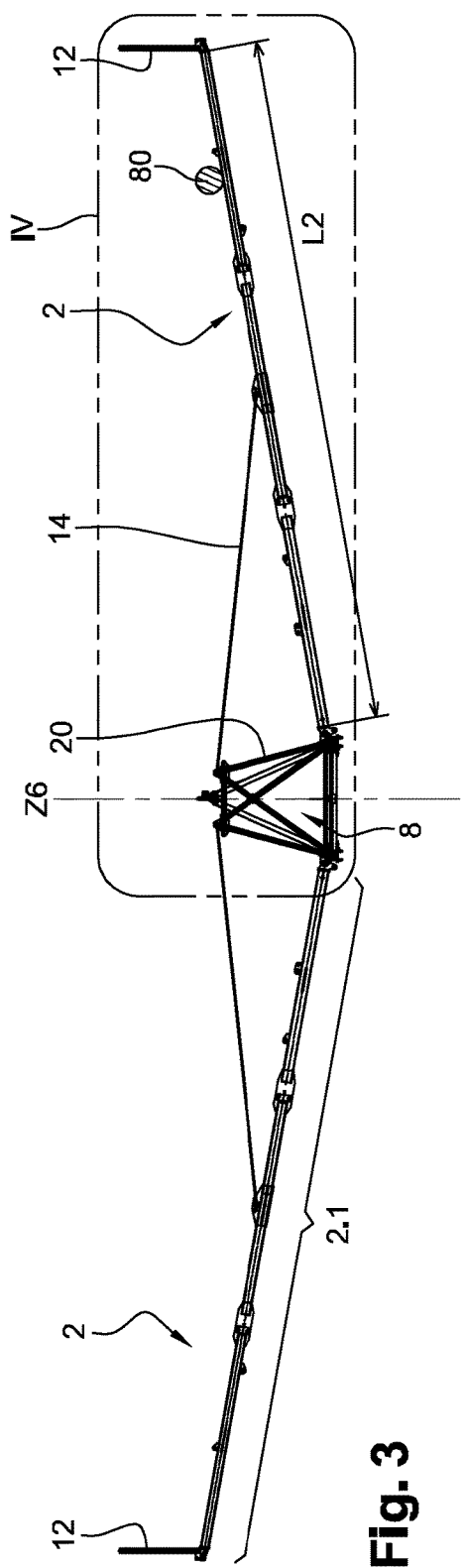
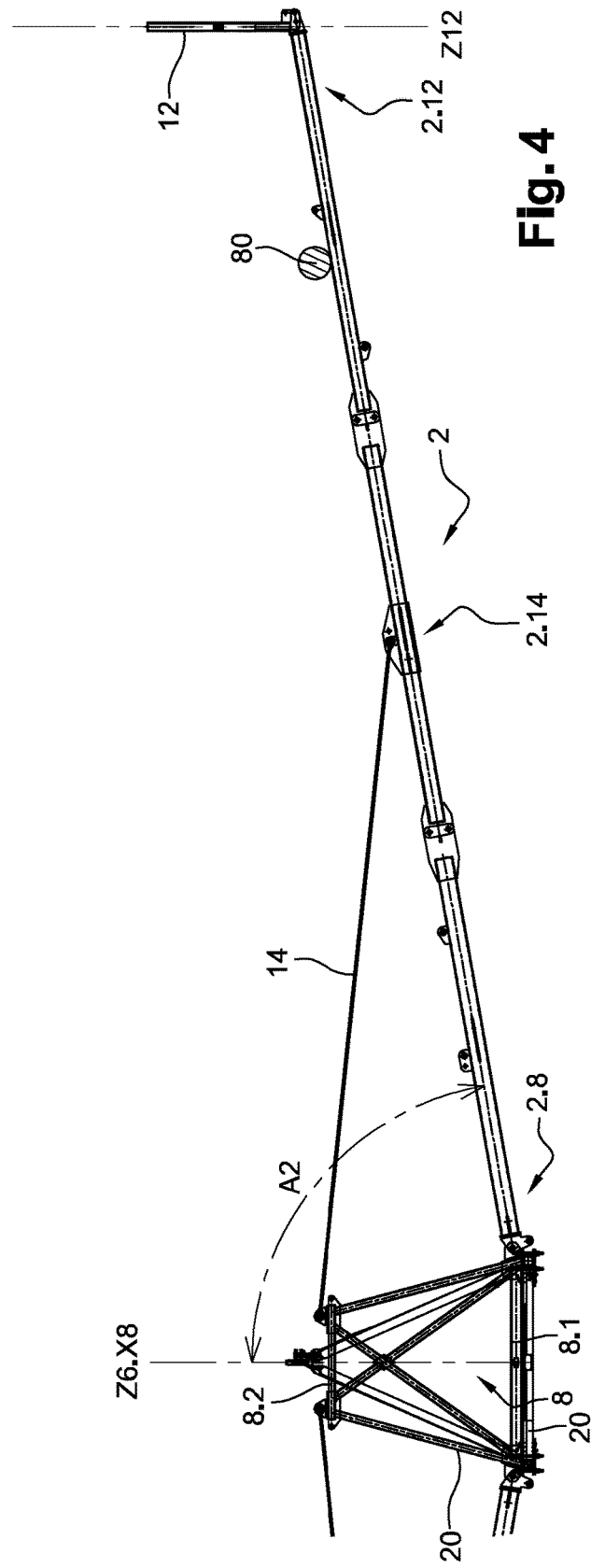
Fig. 3
Fig. 4

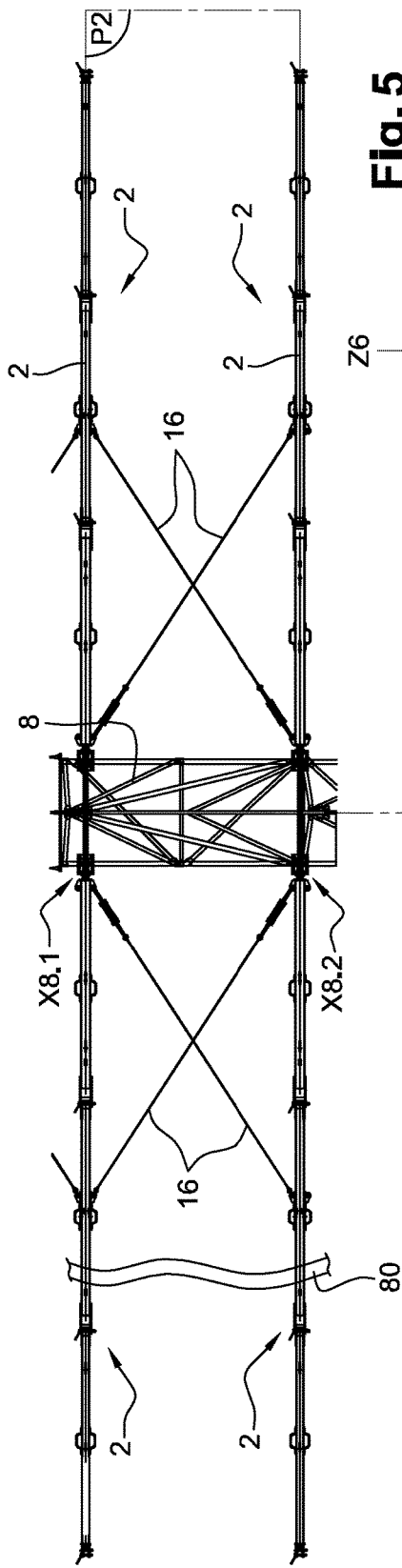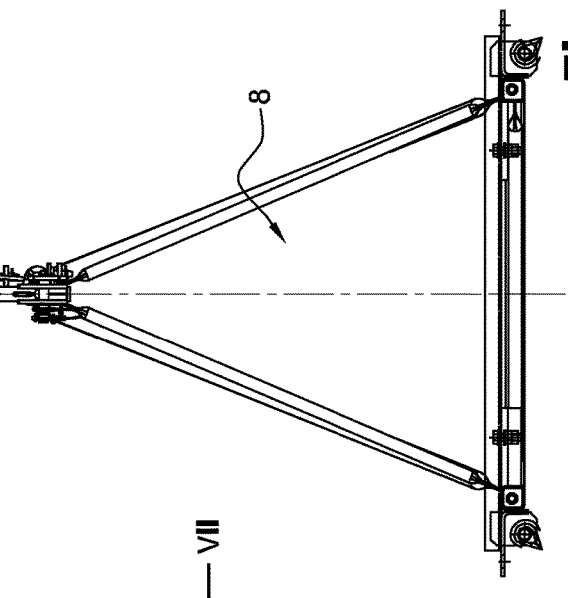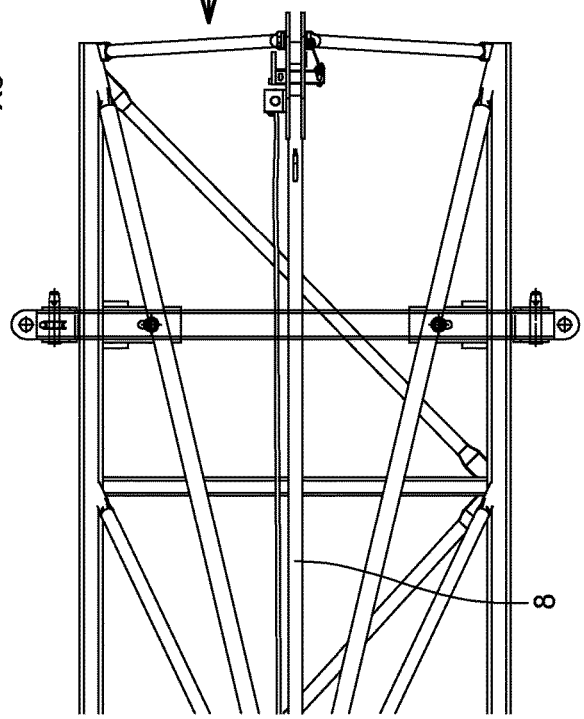

Fig. 8
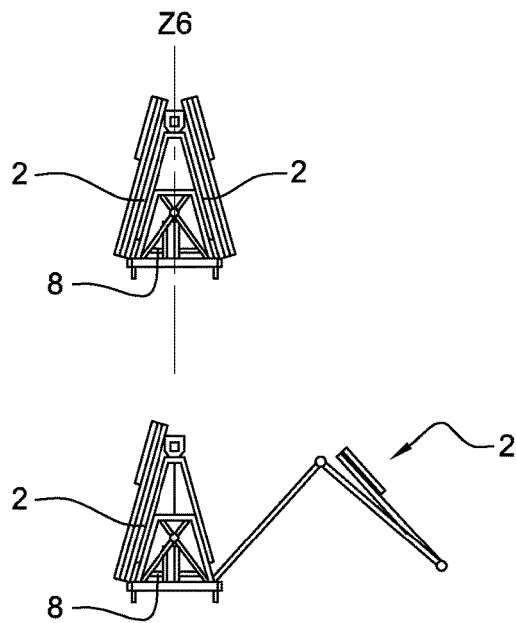
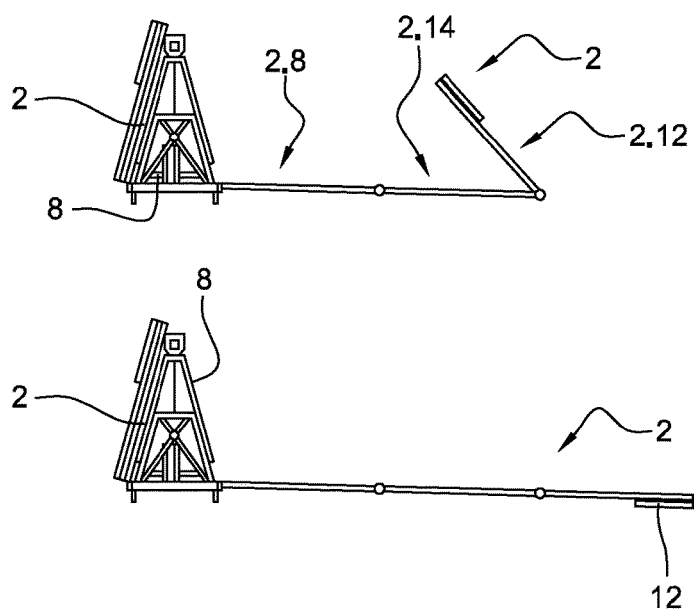
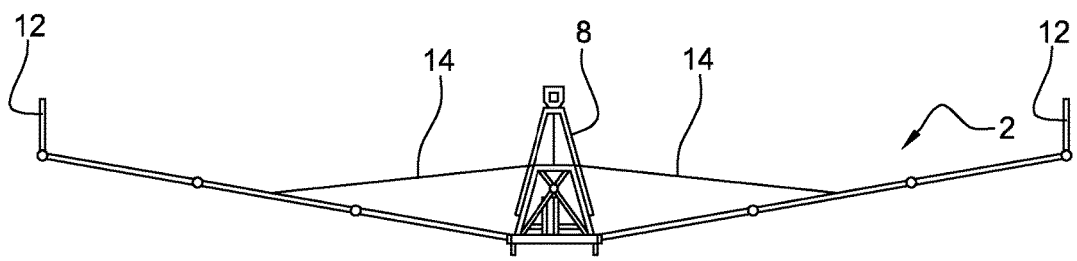

INSTALLATION AND SUPPORT METHOD INCLUDING A TOWER CRANE FOR SUPPORTING A HIGH-VOLTAGE LINE ELECTRIC CABLE

CROSS-REFERENCE TO RELATED APPLICATION

This application claims priority under 35 U.S.C. § 119(a) to French Patent Application No. 16/56163, filed on Jun. 30, 2016, the disclosure of which is incorporated fully by reference herein.

FIELD

The present disclosure relates to a support installation for supporting at least one electric cable belonging to a high-voltage line. In addition, the present disclosure relates to a support method for supporting at least one electric cable belonging to a high-voltage line. The support method can thus implement a support installation in accordance with the invention.

BACKGROUND

In the present application, a "high-voltage line" may refer to a medium-voltage overhead line, a high-voltage overhead line, or a very high-voltage overhead line. A high-voltage line comprises pylons or posts and electric cables which are suspended from these pylons or posts. During implantation or maintenance work of the high-voltage line, it is necessary to support the electric cables of a high-voltage line to maintain these electric cables in the air, for example above a preserved space such as a traffic lane.

In the present application, a "tower crane" refers to a crane having a mast and a jib, for example cranes with placing jibs or cranes with lifting jibs.

FR2778193A1 describes a support installation for supporting electric cables belonging to a high-voltage line during implantation work of the high-voltage line. The support installation of FR2778193A1 comprises a movable crane including articulated mesh structures and an auxiliary bearing leg located opposite the mast of the movable crane and configured to distribute the forces induced by the electric cables on the movable crane and to balance the support installation.

However, the support installation of FR2778193A1 is complex and long to implant on a site of work, in particular because all its structure has to be unfolded and the auxiliary bearing leg has to be positioned correctly.

SUMMARY

One aim of the present disclosure is to solve, in whole or in part, the drawbacks described above.

For this purpose, one object of the present disclosure is a support installation, for supporting at least one electric cable belonging to a high-voltage line, for example during implantation or maintenance work of the high-voltage line, the support installation comprising support members configured to support said at least one electrical cable, the support installation being characterized:

in that the support installation comprises a tower crane, the tower crane comprising a mast and a jib linked to an upper portion of the mast, the jib extending according to a jib direction and the mast extending according to a mast direction which is substantially vertical when the support installation is in a service configuration, in that the support members are secured to the jib and disposed at a plurality of locations distant according to a jib direction, the support members extending generally transversally to the jib direction so as to protrude laterally from the jib when the support installation is in the service configuration, and in that the jib is cantilevered when the support installation is in the service configuration.

In other words, the jib has a free end portion located opposite the mast when the support installation is in the service configuration. Therefore, the support installation is devoid of an auxiliary bearing leg supporting the jib opposite the mast. The jib is configured to be cantilevered when the support installation is in the service configuration, that is to say when the or each electric cable is supported by the support members.

Thus, such a support installation allows to support electric cables of high-voltage lines, while being rapid and simple to implant on a work site, because such a support installation dispenses with unfolding and mounting an auxiliary bearing leg supporting the jib opposite the mast of the tower crane. In addition, such a support installation occupies a minimum overall dimension on the ground, because such a support installation dispenses with unfolding and mounting an auxiliary bearing leg supporting the jib opposite the mast of the tower crane.

As the support members protrude laterally from the jib, the support members extend on at least one side of the jib, that is to say in a half-space delimited by a plane including the jib direction and the mast direction.

The support members can support said at least one cable either directly or indirectly via an intermediate component disposed on the support members. According to a variant, the support installation further comprises plates disposed on the support members, each plate being configured to support at least one electric cable.

According to a variant, several of the support members which protrude laterally on the same side of the jib together define a support plane. For example, the upper portions of several, for example all, of the support members which protrude laterally on the right side of the jib are coplanar. Similarly, the upper portions of several, for example all, of the support members which protrude laterally on the left side of the jib are coplanar.

According to a variant, the jib and the mast are configured to resist the forces induced by said at least one electric cable resting on the support members.

According to a variant, the mast and the jib are articulated so as to fold the tower crane in a transport configuration. Thus, the support installation is easy to transport.

When the support installation is in the service configuration, the jib is articulated relative to the mast at least in rotation (tower crane) about the mast direction. Moreover, the jib can additionally be pivotally articulated relative to the mast and about an axis orthogonal to the mast direction and to the jib direction (lifting jib crane).

According to an embodiment, the support installation further comprises a locking device configured to lock the jib in rotation relative to the mast when the support installation is in the service configuration.

Thus, such a locking device allows to laterally stabilize the jib.

According to an embodiment, the jib has a free end portion, and the locking device comprises at least one guy cable, for example several guy cables, linked to the free end portion.

Thus, the or each guy cable allows to rapidly lock the jib in rotation.

Alternatively to this embodiment, the locking device comprises a locking mechanism arranged on a crown configured to link in rotation the mast and the jib.

According to a variant, the free end portion extends from the free end of the jib and the free end portion has a length representing between 0% and 25%, preferably between 0% and 10%, of the distance separating the mast from the free end of the jib. For example, said at least one guy cable may be linked to the free end of the jib.

According to a variant, the support installation comprises a fastening element which is secured to the free end portion, the fastening element being configured to fasten said at least one guy cable to the jib.

According to a variant, said at least one guy cable is surrounded by a textile sheath. Thus, said at least one guy cable does not risk damaging the electric cables.

According to an embodiment, at least one of the support members forms, with a vertical plane including the jib direction, an angle comprised between 90 degrees and 30 degrees.

In other words, each support member rises as we move away from the jib. Thus, such an angle allows to retain the or each electric cable bearing on the support members.

According to a variant, at least one support member extends generally according to a support direction, the support direction forming an angle less than or equal to 90 degrees with a vertical plane including the jib direction.

For example, the support direction forms an angle less than 90 degrees (acute angle) with a vertical plane including the jib direction. According to another example, the support direction forms an angle equal to 90 degrees with the jib direction; in other words, the support member extends perpendicularly to the vertical plane including the jib direction.

According to a variant, each support member extends generally according to a respective support direction forming an angle less than or equal to 90 degrees, for example an acute angle, with a vertical plane including the jib direction.

According to an embodiment, the support members protrude laterally on either side of the jib.

According to an embodiment, at least two support members located on the two opposite sides of the jib are arranged in the same location according to the jib direction.

According to a variant, the support members are paired so as to be located in pairs in the same location according to the jib direction. In other words, two support members originate substantially from the same location and extend respectively on the right and left sides of the jib.

According to an embodiment, at least one of the support members comprises a generally rectilinear part.

Thus, such a support member provides a large support area for supporting said at least one electric cable.

According to a variant, each of the support members comprises a generally straight part.

According to a variant, each support member has a length comprised between 3 meters (m) and 10 m, for example approximately equal to 7 m.

According to an embodiment, each of the support members is displaceable between an unfolded configuration, in which each support member protrudes laterally from the jib, and a folded configuration, in which each support member is disposed adjacent the jib.

Thus, such support members are not very bulky in the folded configuration.

According to an embodiment, the support installation further comprises retaining elements, each retaining element extending in an end area of a respective support member, each retaining element being configured to retain said at least one electric cable bearing on the respective support member.

Thus, such retaining elements are configured to prevent the electric cable from escaping from the support members, in particular by their possible free edges.

According to a variant, each retaining element comprises a bar extending according to a retaining direction which forms a retaining angle comprised between 0 degrees and 45 degrees with the mast direction when the support installation is in the service configuration.

According to a variant, each retaining element has a length comprised between 30 centimeters (cm) and 100 cm, for example approximately equal to 60 cm.

According to an embodiment, the support installation further comprises traction elements, each traction element being linked, on the one hand, to the jib and, on the other hand, to at least one support member, each traction element being configured to transmit forces to the jib from at least one respective support member.

Thus, such traction elements allow to transfer to the jib a part of the forces induced by the mass of the cables on the support members.

According to a variant, when the support installation is in the service configuration, at least one of the traction elements is linked to an upper chord member of the jib. For example, several of the traction elements are linked to respective upper chord members of the jib. Particularly, each of the traction elements can be linked to a respective upper chord member of the jib.

According to a variant, several of the support members are linked to respective lower chord members of the jib. Particularly, each of the support members can be linked to a respective lower chord member of the jib.

In the present application, the terms "lower" and "upper" are used depending on the relative altitude of an element of the support installation. For example, a lower chord member of the jib is located lower than an upper chord member of the jib.

According to an embodiment, the support installation further comprises lateral stabilizing elements, each lateral stabilizing element being configured to link at least two neighboring support members so as to transmit forces according to the jib direction between these neighboring support members.

Thus, such lateral stabilizing elements allow to stabilize the jib, therefore the tower crane, which increases the safety on the work site.

According to an embodiment, each support member comprises a proximal portion, a distal portion and an intermediate portion connecting the proximal portion and the distal portion, each lateral stabilizing element being arranged so as to link the proximal portion of a support member to the intermediate portion of the neighboring support member.

Thus, the lateral stabilizing elements thus arranged allow to stabilize the support members very effectively.

According to an embodiment, when the support installation is in the service configuration, at least one of the support members is linked to a lower chord member of the jib.

Thus, the moment transmitted by each support member to the jib about the jib direction can be maximal.

According to an embodiment, the support installation further comprises fastening frames, each fastening frame being configured to fasten at least one support member to the jib at one of said distant locations Thus, such fastening frames allow to rapidly fasten the support members to the jib.

According to a variant, each fastening frame has dimensions matching with the transverse section of the jib. Thus, each fastening frame can transmit all of the relevant forces to the jib.

According to a variant, each fastening frame can slide along the jib before being immobilized on the jib by immobilization accessories. Thus, the locations of the fastening frames along the jib can be adjusted.

According to an embodiment, the jib comprises reinforcing tubes, each reinforcing tube linking a lower chord member to an upper chord member, each reinforcing tube being dimensioned by complying with a predetermined criterion of resistance to compression buckling.

Thus, such reinforcing tubes allow for the mechanical resistance of the jib. In particular, these reinforcing tubes allow to convert a conventional jib into a support jib to support electric cables in addition to the usual stresses (wind).

According to a variant, each reinforcing tube has a ratio of its diameter over its length greater than or equal to 10%.

According to an embodiment, the jib comprises a number of reinforcing tubes comprised between 65 and 200, and a distance between two consecutive reinforcing tubes according to the jib direction is comprised between 1m and 3m.

Moreover, an object of the present disclosure is to provide a support method for supporting at least one electric cable belonging to a high-voltage line, for example during implantation or maintenance work of the high-voltage line, The support method comprising the steps of:
providing for a tower crane comprising a mast and a jib,
placing the tower crane in the service configuration so that: the jib is linked to an upper portion of the mast, the jib extends according to a jib direction, and the mast extends according to a mast direction which is substantially vertical,
equipping the tower crane with support members secured to the jib and configured to support said at least one electric cable at a plurality of locations spaced along the jib direction,
extending the support members generally transversally to the jib direction so that the support members protrude laterally from the jib,
positioning the jib with a free end portion located opposite the mast so that the jib is cantilevered when the support installation is in the service configuration, and
locking the jib in rotation relative to the mast by means of a locking device.

The embodiments and variants mentioned above can be taken in isolation or according to various combinations thereof.

BRIEF DESCRIPTION OF THE DRAWINGS

The present disclosure will be well understood and its advantages will also emerge in the light of the following description, given only by way of non-restrictive example and made with reference to the appended figures, in which identical reference signs correspond to structurally and/or functionally identical or similar elements. In the appended figures:

FIG. 3 is a section view taken at the plane III-III in FIG. 2, according to an embodiment;

FIG. 4 is a view of the detail IV in FIG. 3, according to an embodiment;

FIG. 5 is a partial bottom view of the detail V in FIG. 2, according to an embodiment;

FIG. 6 is a partial top view of the detail V of a jib of the support installation in FIG. 1, according to an embodiment;

FIG. 7 is a front view of the detail VII of the jib in FIG. 6, according to an embodiment; and FIG. 8 is a front sequential view illustrating steps for establishing the support installation of FIG. 1, according to an embodiment.

DESCRIPTION

Figure 1:
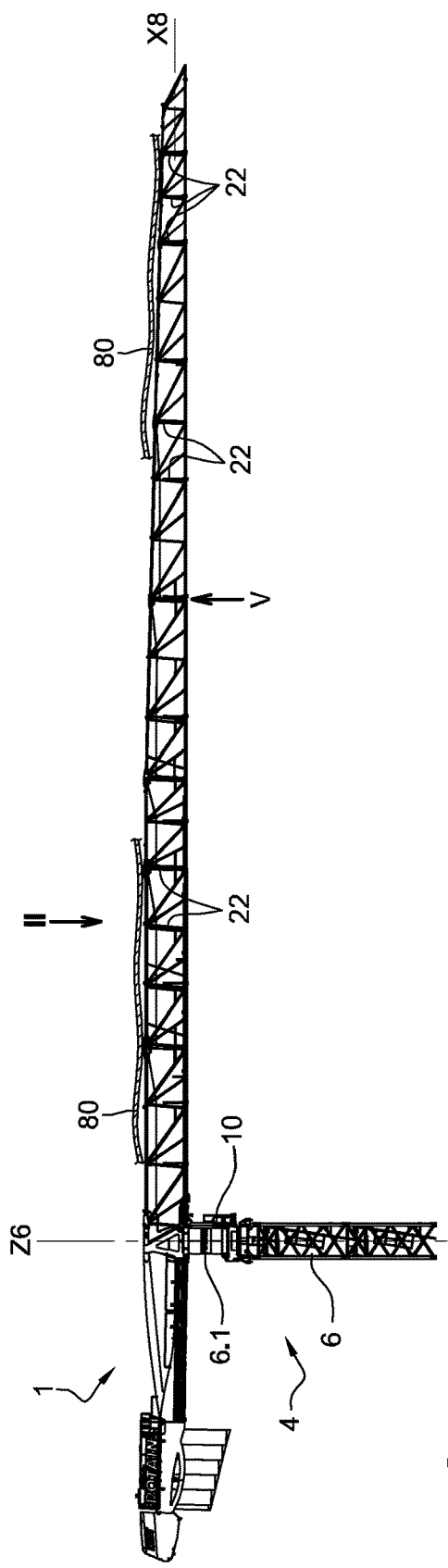
FIG. 1 is a schematic side view of a part of a support installation according to an embodiment and in the service configuration.

The present embodiments will now be further described. In the following passages, different aspects of the embodiments are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

FIGS. 1 to 7 illustrate a support installation 1 for supporting electric cables 80 belonging to a high-voltage line, according to embodiments described herein. The support installation 1 can, for example, be used during implantation or maintenance work of the high-voltage line.

The support installation 1 comprises:
i) support members 2 configured to support each electric cable 80, and
ii) a tower crane 4.

The tower crane 4 comprises a mast 6 and a jib 8. The jib 8 is linked to an upper portion 6.1 of the mast 6. The jib 8 extends according to a jib direction X8. The mast 6 extends according to a mast direction Z6 which is substantially vertical when the support installation 1 is in the service configuration, as in FIG. 1.

When the support installation 1 is in the service configuration, the jib 8 is articulated relative to the mast 6 in rotation (tower crane) about the mast direction. Moreover, the mast 6 and the jib 8 are articulated so as to fold the tower crane 4 into a transport configuration.

As shown in FIG. 1, the jib 8 is cantilevered when the support installation 1 is in the service configuration. In other words, the jib 8 has a free end portion located opposite the mast 6 when the support installation 1 is in the service configuration. Therefore, the support installation 1 is devoid of an auxiliary bearing leg supporting the jib 8 opposite the mast 6.

In addition, the support installation 1 comprises a locking device 10 (FIG. 1) which is configured to lock the jib 8 in rotation relative to the mast 6 when the support installation 1 is in the service configuration. In the example of the Figures, the locking device comprises a locking mechanism arranged on a crown configured to link in rotation the mast 6 and the jib 8.

Figure 2:
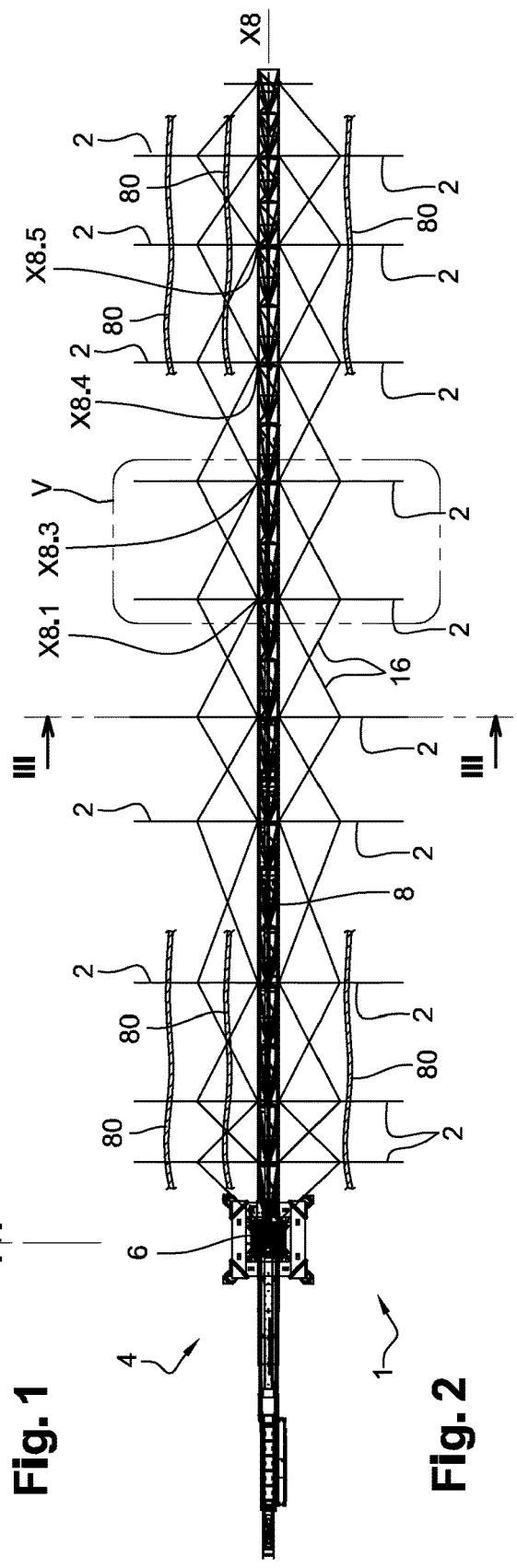
FIG. 2 is a top view of a jib of the support installation, taken along II in FIG. 1, according to an embodiment.

In one embodiment, as shown in FIG. 2, the support members 2 are 10 in number. However, the number of support members 2 may vary. The support members 2 are secured to the jib 8. The support members 2 are disposed at a plurality of locations X8.1, X8.2, X8.3, X8.4, X8.5 etc. The locations X8.1, X8.2, X8.3, X8.4, X8.5, etc. are spaced in pairs according to the jib direction X8. In the example of the Figures, several of the locations X8.1, X8.2, X8.3, X8.4, X8.5 etc. are spaced substantially evenly according to the jib direction X8.

The support members 2 extend generally transversally to the jib direction X8 so as to protrude laterally from the jib 8 when the support installation 1 is in the service configuration. In the example of Figures, each of the support members 2 extends in a plane orthogonal to the jib direction X8.

As shown in FIG. 4, in one embodiment, each support member 2 may comprise a generally straight part 2.1. Each support member 2 forms, with a vertical plane Z6.X8 including the jib direction X8, an angle A2 approximately equal to 70 degrees. Each support member in this embodiment may have a length L2 approximately equal to 7m, for example. However, the present disclosure is not limited thereto.

The support members 2 protrude laterally on either side of the jib 8. Two support members 2 located on the two opposite sides of the jib 8 are arranged in pairs in the same location X8.1, X8.2, X8.3, X8.4, X8.5 etc. According to the jib direction X8. In other words, the support members 2 are paired so as to be located in pairs at the same location according to the jib direction X8.

Several of the support members 2 which protrude laterally on the same side of the jib 8 together define a support plane P2. In the example of FIG. 5, the upper portions of all support members 2 which protrude laterally on the right side of the jib 8 are coplanar (support plane P2). Likewise, the upper portions of all the support members which protrude laterally on the left side of the jib 8 are coplanar.

As shown in FIG. 4, the support installation 1 further comprises retaining elements 12. Each retaining element 12 is configured to retain the electric cables 80 bearing on the respective support member 2.

Each retaining element 12 here extends to the end of a respective support member 2. Each retaining element 12 comprises a bar which extends according to a retaining direction Z12 forming a retaining angle approximately equal to 0 degrees, for example, with the mast direction Z8 when the support installation 1 is in the service configuration. Each retaining element here has a length approximately equal to 60 cm, but is not limited thereto.

As shown in FIG. 3, the support installation 1 further comprises traction elements 14. Each traction element 14 is linked, on the one hand, to the jib 8 and, on the other hand, to a support member 2. Each traction element 14 is configured to transmit forces to the jib 8 from at least one respective support member 2. In use, each traction element 14 operates in traction.

As shown in FIGS. 2 and 5, the support installation 1 further comprises lateral stabilizing elements 16. Each lateral stabilizing element 16 is configured to link two neighboring support members 2 so as to transmit forces according to the jib direction X8 between these neighboring support members 2. In use, each lateral stabilizing element 16 operates in traction.

As shown in FIG. 4, each support member 2 comprises a proximal portion 2.8, a distal portion 2.12 and an intermediate portion 2.14. For each support member 2, the intermediate portion 2.14 connects the proximal portion 2.8 and the distal portion 2.12. Each lateral stabilizing element 16 is arranged so as to link the proximal portion 2.8 of a support member 2 to the intermediate portion 2.14 of the neighboring support member 2.

The support installation 1 further comprises fastening frames 20. Each fastening frame 20 is configured to fasten a respective support member 2 to the jib 8 at one of the spaced locations X8.1, X8.2, X8.3, X8.4, X8.5 etc.

Each fastening frame 20 has dimensions matching with the cross section of the jib 8. Each fastening frame 20 is configured to slide along the jib 8 before being immobilized on the jib 8 by immobilization accessories.

As shown in FIG. 4, when the support installation 1 is in the service configuration, each support member 2 is linked by means of the fastening frame 20, to a lower chord member 8.1 of the jib 8. When the support installation 1 is in the service configuration, each traction element 14 is linked, by means of the fastening frame 20, to an upper chord member 8.2 of the jib 8.

The jib 8 and the mast 6 are configured to resist or withstand the forces induced by the electric cables 80 resting on the support members 2. For this purpose, the jib 8 comprises reinforcing tubes 22. Each reinforcing tube 22 links a lower chord member 8.1 to an upper chord member 8.2. Each reinforcing tube 22 can be dimensioned by complying with a predetermined criterion of resistance to compression buckling (absence of buckling). Each reinforcing tube 22 here has a ratio of its diameter over its length greater than or equal to 10%.

The jib 8 comprises a number of reinforcing tubes 22 approximately equal to 65, but not limited thereto. A distance between two consecutive reinforcing tubes 22 according to the jib direction X8 is comprised between 1m and 3m, but is not limited thereto.

As shown in FIG. 8, each of the support members 2 is displaceable between an unfolded configuration (low FIG. 8), in which each support member 2 protrudes laterally from the jib 8, and a folded configuration, in which each support member 2 is disposed adjacent the jib 8 (high FIG. 8).

Moreover, an object of the present disclosure is a support method for supporting the electric cables 80 belonging to the high-voltage line. The support method comprises the steps of:

providing for a tower crane 4 comprising a mast 6 and a jib 8 (FIG. 1), placing the tower crane 4 in the service configuration so that (FIG. 1): the jib 8 is linked to an upper portion of the mast 6, the jib 8 extends according to a jib direction X8, and the mast 6 extends according to a mast direction Z6 which is substantially vertical, equipping the tower crane 4 with support members 2 secured to the jib 8 (FIGS. 1 to 5) and configured to support said at least one electric cable 80 at a plurality of locations X8.1, X8.2, X8.3, X8.4, X8.5 etc. spaced along the jib direction X8, extending the support members 2 (FIG. 8) generally transversally to the jib direction X8 so that the support members 2 protrude laterally from the jib 8 (FIG. 4), positioning the jib 8 with a free end portion located opposite the mast 6 (in other words, so that the jib 8 is cantilevered when the support installation 1 is in the service configuration), and locking the jib 8 in rotation relative to the mast 6 by means of a locking device 10.

The support installation 1 is then in the service configuration.

Of course, the present disclosure is not limited to the particular embodiments described in the present patent application, or to embodiments that are within the reach of those skilled in the art. Other embodiments can be considered without departing from the scope of the invention, starting from any element equivalent to an element indicated in the present patent application.

The invention claimed is:

1. A support installation for supporting at least one electric cable belonging to a high-voltage line, during implantation or maintenance work of the high-voltage line, the support installation comprising support members configured to support said at least one electric cable, and further comprising:
a tower crane, the tower crane comprising a mast and a jib linked to an upper portion of the mast and rotatable relative to the mast, the jib extending according to a jib direction and the mast extending according to a mast direction which is substantially vertical when the support installation is in a service configuration,
wherein, the support members are secured to the jib and disposed at a plurality of locations spaced along to the jib direction, the support members extending substantially transversally to the jib direction so as to protrude laterally from the jib when the support installation is in the service configuration,
wherein, the jib is cantilevered when the support installation is in the service configuration,
wherein the support members are disposed at a plurality of locations along a length of the jib on each side of the jib and protrude laterally from each side of the jib, and
wherein each of the support members is displaceable between an unfolded configuration, in which each support member protrudes laterally from the jib, and a folded configuration, in which each support member is disposed adjacent the jib.

2. The support installation according to claim 1, wherein the support installation further comprises a locking device configured to lock the jib in rotation relative to the mast when the support installation is in the service configuration.

3. The support installation according to claim 2, wherein the jib has a free end portion, and wherein the locking device comprises at least one guy cable linked to the free end portion.

4. The support installation according to claim 1, wherein at least one of the support members forms an angle comprised between 90 degrees and 30 degrees with a vertical plane including the jib direction.

5. The support installation according to claim 1, wherein at least two support members located on the two opposite sides of the jib are arranged at the same location (X8.1) according to the jib direction.

6. The support installation according to claim 1, wherein at least one of the support members comprises a straight part.

7. The support installation according to claim 1, further comprising retaining elements, each retaining element extending in an end area of a respective support member, each retaining member being configured to retain said at least one electric cable bearing on the respective support member.

8. The support installation according to claim 1, further comprising traction elements, each traction element being linked, on the one hand, to the jib and, on the other hand, to at least one support member, each traction element being configured to transmit forces to the jib (8) from at least one respective support member.

9. The support installation according to claim 1, further comprising lateral stabilizing elements, each lateral stabilizing element being configured to link at least two neighboring support members so as to transmit forces according to the jib direction between these neighboring support members.

10. The support installation according to claim 9, wherein each support member comprises a proximal portion, a distal portion and an intermediate portion connecting the proximal portion and the distal portion, each lateral stabilizing element being arranged so as to link the proximal portion of a support member of the plurality of support members to the intermediate portion of the neighboring support member of the plurality of support members.

11. The support installation according to claim 1, wherein, when the support installation is in the service configuration, at least one of the support members is linked to a lower chord member of the jib.

12. The support installation according to claim 1, further comprising fastening frames, each fastening frame being configured to fasten at least one support member to the jib at one of said distant locations.

13. The support installation according to claim 1, wherein the jib comprises reinforcing tubes, each reinforcing tube linking a lower chord member to an upper chord member, each reinforcing tube being sized by complying with a predetermined criterion of resistance to compression buckling.

14. The support installation according to claim 13, wherein the jib comprises a number of reinforcing tubes comprised between 65 and 200, and wherein a distance between two consecutive reinforcing tubes according to the jib direction is comprised between 1 meter and 3 meters.

15. A support method for supporting at least one electric cable belonging to a high-voltage line, during implantation or maintenance work of the high-voltage line,
the support method comprising the steps of:
providing for a tower crane comprising a mast and a jib rotatable relative to the mast,
placing the tower crane in the service configuration so that: the jib is linked to an upper portion of the mast, the jib extends according to a jib direction, and the mast extends according to a mast direction which is substantially vertical,
equipping the tower crane with support members secured to the jib and configured to support said at least one electric cable at a plurality of locations distant according to the jib direction,
extending the support members substantially transversally to the jib direction so that the support members protrude laterally from the jib,
positioning the jib with a free end portion located opposite the mast so that the jib is cantilevered when the support installation is in the service configuration, and locking the jib in rotation relative to the mast with a locking device,
wherein the support members are disposed at a plurality of locations along a length of the jib on each side of the jib and protrude laterally from each side of the jib, and
wherein each of the support members is displaceable between an unfolded configuration, in which each support member protrudes laterally from the jib, and a folded configuration, in which each support member is disposed adjacent the jib.

16. A tower crane comprising:
   a jib rotatably connected to an upper portion of the mast and extending in a jib direction, wherein the jib is cantilevered on the mast in a cantilevered condition; and
support members secured to the jib at a plurality of locations spaced in the jib direction along a length of the jib so as to extend laterally outward from the jib, wherein the support members are configured to support cables with the jib in the cantilevered condition,
wherein the support members are disposed at a plurality of locations along a length of the jib on each side of the jib and protrude laterally from each side of the jib, and
wherein each of the support members is displaceable between an unfolded configuration, in which each support member protrudes laterally from the jib, and a folded configuration, in which each support member is disposed adjacent the jib.

* * * * *

UNITED STATES PATENT AND TRADEMARK OFFICE
CERTIFICATE OF CORRECTION

| | | |
|---|---|---|
| PATENT NO. | : 10,479,655 B2 | Page 1 of 1 |
| APPLICATION NO. | : 15/637934 | |
| DATED | : November 19, 2019 | |
| INVENTOR(S) | : Joachim Fernandez et al. | |

It is certified that error appears in the above-identified patent and that said Letters Patent is hereby corrected as shown below:

In the Specification

In Column 5, Line 6, delete "locations" and insert -- locations. --, therefor.

In Column 5, Line 38, delete "line," and insert -- line. --, therefor.

In Column 6, Line 24, delete "DESCRIPTION" and insert -- DETAILED DESCRIPTION --, therefor.

In the Claims

In Column 9, Line 66, in Claim 8, delete "jib (8)" and insert -- jib --, therefor.

Signed and Sealed this
Thirtieth Day of June, 2020

Andrei Iancu
*Director of the United States Patent and Trademark Office*